United States Patent [19]

Eichholtz et al.

[11] Patent Number: 4,789,531

[45] Date of Patent: Dec. 6, 1988

[54] METHOD OF REMOVING NITROGEN OXIDES ($NO_x$) FROM GASES, ESPECIALLY FLUE GASES

[75] Inventors: Andreas Eichholtz, Recklinghausen; Helmut Weiler, Velbert, both of Fed. Rep. of Germany

[73] Assignee: Steag Aktiengesellschaft, Essen, Fed. Rep. of Germany

[21] Appl. No.: 105,511

[22] Filed: Oct. 2, 1987

Related U.S. Application Data

[63] Continuation of Ser. No. 875,983, Jun. 18, 1986, abandoned.

[30] Foreign Application Priority Data

Jun. 29, 1985 [DE] Fed. Rep. of Germany ....... 3523326

[51] Int. Cl.$^4$ .......................... C01B 21/00; C01C 3/00
[52] U.S. Cl. .................................... 423/235; 423/239; 423/242; 423/351
[58] Field of Search ............... 423/239 A, 235 D, 351

[56] References Cited

U.S. PATENT DOCUMENTS

| | | | |
|---|---|---|---|
| 4,044,102 | 8/1977 | Muraki et al. | 423/239 A |
| 4,046,888 | 9/1977 | Maeshima et al. | 423/239 |
| 4,087,250 | 5/1978 | Lane et al. | 423/239 A |
| 4,469,662 | 9/1984 | Hamada et al. | 423/235 |
| 4,500,501 | 2/1985 | Hamada et al. | 423/235 |

FOREIGN PATENT DOCUMENTS 0010282 6/1973 Japan ............................. 423/239 A Primary Examiner—John Doll
Assistant Examiner—Lori S. Freeman
Attorney, Agent, or Firm—Herbert Dubno

[57] ABSTRACT $NO_x$ is removed from flue gases by contacting same in the presence of active coke/active carbon and a reducing agent, e.g. $NH_3$, CO or $H_2$. According to the invention, the adsorbent is precharged with the reducing agent, thereby increasing the surface area over which the adsorbent can react with the flue gas and decreasing the levels of gas-reducing agent which must be used and which may appear in the cleaned gas.

12 Claims, 3 Drawing Sheets

METHOD OF REMOVING NITROGEN OXIDES (NO$_x$) FROM GASES, ESPECIALLY FLUE GASES

This is a continuation of co-pending application Ser. No. 875,983 filed on June 18, 1986, now abandoned.

FIELD OF THE INVENTION

Our present invention relates to a method of removing or eliminating nitrogen oxides (NO$_x$) from waste gases, especially flue gases by an adsorption process in which the adsorption is effected on active carbon or active coke or mixtures thereof, i.e. a solid adsorbent, in the presence of a reducing agent or reductant, especially ammonia, carbon monoxide or hydrogen.

BACKGROUND OF THE INVENTION

It is known to remove or recover nitrogen oxides (NO$_x$) from flue gases using an adsorbent such as active carbon or active coke in conjunction with a reducing agent in the form of ammonia, carbon monoxide or hydrogen, or mixtures thereof, to limit the nitrogen oxide levels in gases which are vented to the atmosphere.

The flue gases in which these processes are practiced are generally flue gases which arise from the combustion of low sulfur fuels, or combustion gases in which the sulfur dioxide content has been reduced in a prior desulfurization apparatus utilizing wet, semidry or dry desulfurization processes.

Adsorbents which can be used to remove the sulfur dioxide component can be solutions or suspensions of calcium, magnesium, sodium or ammonia-based compounds as is described, for example, in W. Kaminsky, *Chem. Ing.-Technik* 55 (1983), pages 673 ff.

At the present time, apart from the elimination of sulfur dioxide from flue gases which are vented into the atmosphere, it is imperative to reduce or eliminate NO$_x$ emissions.

In German patent document DE-OS. No. 29 11 712, for example, a process is described in which the flue gases pass through a traveling bed of carbon-containing adsorbent with metered amounts of gaseous ammonia. A reducing agent is added to catalytically reduce the nitrogen oxides to nitrogen with the production of water vapor.

This process has the disadvantage that the introduction of the reducing agent into the flue gas before the resulting mixture enters the bed can effect a sufficient removal of nitrogen oxides, i.e. a nitrogen oxide removal efficiency above 60%, only when the flue gas is provided with a significant excess of the reducing agent above the stoichiometric amount required for the theoretical reduction of all of the nitrogen oxide content of the flue gas.

It is an obvious disadvantage that excess reducing agent must be used to obtain the desired degree of nitrogen oxide removal.

OBJECTS OF THE INVENTION

It is, therefore, the principal object of the present invention to provide an improved method of removing nitrogen oxides from a gas which avoids excessive use of the reducing agent.

Another object of our invention is to provide an improved method which allows high separation efficiency for nitrogen oxides with reduction in the amount of the reducing agent which is used.

SUMMARY OF THE INVENTION

These objects and others which will become apparent hereinafter are attained, in accordance with the present invention whereby the adsorbent, before it is contacted with the flue gas, is precharged with at least a portion of the required reducing agent so that the adsorbent, thus precharged with the reducing agent, is then brought into contact with the flue gas stream for the catalytic conversion of the nitrogen oxides therein to elemental nitrogen.

The invention is based upon our discovery that the reaction between the nitrogen oxides and the reducing agent takes place both on the external and internal surfaces of the adsorbent. With the precharging provided with the present invention, the solid adsorbent internal and external surfaces are utilized as reducing agent storage surfaces so that the reaction between the nitrogen oxides and the reducing agent at the surface will not be limited by the availability of the reducing agent at the surface.

By comparison to a system in which the reducing agent is supplied to the flue gas before it is contacted with the adsorbent, therefore, the method of the invention permits the reaction to occur on maximum surface areas of the adsorbent without any delay or impediment as may be required for diffusion of the reducing agent from the gas phase into the adsorbent.

The precharging thus gives rise to an increased reaction speed and a more complete reaction in a given residence time of the nitrogen-oxide-containing gases in the bed.

Stated otherwise, as each nitrogen oxide molecule diffuses through the pores of the adsorbent toward inner surfaces thereof, it can meet previously stored reducing agent and the reaction is not impeded by a potential lack of diffusion of the reducing agent from the same gas stream into the adsorbent. The reaction is not limited by any lack in diffusion of the reducing agent as the reaction partner for the nitrogen oxides.

According to a feature of the invention, a flow of the adsorbent and a flow of the reducing agent are merged in uniflow, counterflow or cross flow, or by passing the reducing agent through an agitated bed of the adsorbent.

The preferred technique is the passing of the two streams, i.e. that of the adsorbent entrained in a carrier gas and the reducing agent, in counterflow or by passing the reducing agent through a moving of the adsorbent in an opposite direction bed to that in which the bed moves.

The displacement of the adsorbent can be effected gravitationally (travelling bed), or the movement of the adsorbent can be effected by fluidizing it with the reducing agent.

Efficiency of contact between the reducing agent and the solid adsorbent can be increased by mechanical baffles or the like in the precharging stage, utilizing stirrers or in any other solids-gas contacting arrangement.

It has been found to be advantageous to provide the nitrogen oxide removal following a flue-gas desulfurization. In this case, the precharged adsorbent is contacted with a desulfurized flue gas stream which has been heated following the desulfurization to a temperature of 60° C. to 180° C., preferably 80° C. to 180° C. for the removal of the nitrogen oxides.

A simple technique in accordance with the invention is to pass the precharged adsorbent through a traveling-bed reactor to which the precharged adsorbent is supplied at the top from the precharging stage. The adsorbent is withdrawn from the bottom of this reactor and the usual feed and discharge gates for this purpose can be provided.

From the "spent" adsorbent, particles which are ineffective because of abrasion and wear and solid reaction products which may be recovered from a reaction between the reducing agent and residual sulfur oxides or solids carried over from the desulfurization stage can be removed, e.g. by sieving or other classification techniques, to prevent loss of activity by plugging of the pores of the desorbent. Make up adsorbent can be added and the adsorbent recharged with reducing agent before being recycled to the reactor.

The requisite temperature for the contact between the adsorbent and the gas stream from which the nitrogen oxides are to be removed can be achieved by reheating the desulfurized flue gas utilizing one or more heat exchangers, regeneratively with flue gas prior to desulfurization or with some other external energy source.

From the traveling-bed reactor, the precharged adsorbent can be introduced into a fixed-bed reactor in which case the flue gas from which the nitrogen oxides are to be removed and the reducing agent can be present in two adsorbent reactors which can be alternatively charged with the reducing agent and used for the catalytic decomposition of the nitrogen oxides. The two reactors can be used alternatively in each mode. Reaction products of the reaction between the sulfur oxides and the reducing agent can be withdrawn by the removal of a partial quantity of the adsorbent continuously or intermittently and the regeneration of this portion in another vessel.

Regeneration of the solid adsorbent can be carried out conveniently and after conventional regeneration, the solid adsorbent being preferably precharged with the reducing agent. In many cases it is found to be desirable to precharge the solid adsorbent with the reducing agent in admixture with a diluent gas.

Any excess of the reducing agent following the precharging operation can be added to the flue gas stream before its contact with the precharged adsorbent. Thus the reducing agent which is not taken up by the adsorbent can be mixed with the flue gas so as to be available in the gas phase which which will later contact the adsorbent.

Where the removal of the nitrogen oxides is effected in a traveling-bed reactor, it is advantageous to add fresh adsorbent to compensate for abrasion of the adsorbent during the precharging operation. It will be understood also that one of the advantages of the system is that the speed of the traveling bed of adsorbent can be established based upon the parameters of the nitrogen oxide removal and the pressure loss changes in the traveling bed, independently of the reducing agent parameters for satisfactory removal of the nitrogen oxides.

The precharging of the adsorbent is adjusted by controlling the solids residence time of the adsorbent in the reducing agent, the concentration of the reducing agent in the precharging gas and/or the temperature in the precharging stage.

It is advantageous to supply to the system a proportion of the reducing agent by precharging the adsorbent with amounts equal to 20 to 100% of the quantity of the reducing agent required, supplying the balance, namely 80% to 0%, to the flue gas before the catalytic reaction.

Preferably a minimum of 50% of the reducing agent is precharged into the adsorbent while at most 50% is fed to the flue gas before it meets the adsorbent.

In summary, it can be stated that the precharging of the adsorbent with a reducing agent can increase the reaction speed and reduce the amount of ammonia which is required as the example given below will show. By way of comparison in the cleaned gas, the ammonia concentration of 6.0 mg/m$^3$STP can remain by contrast with levels of 30 mg/m$^3$STP in earlier processes.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
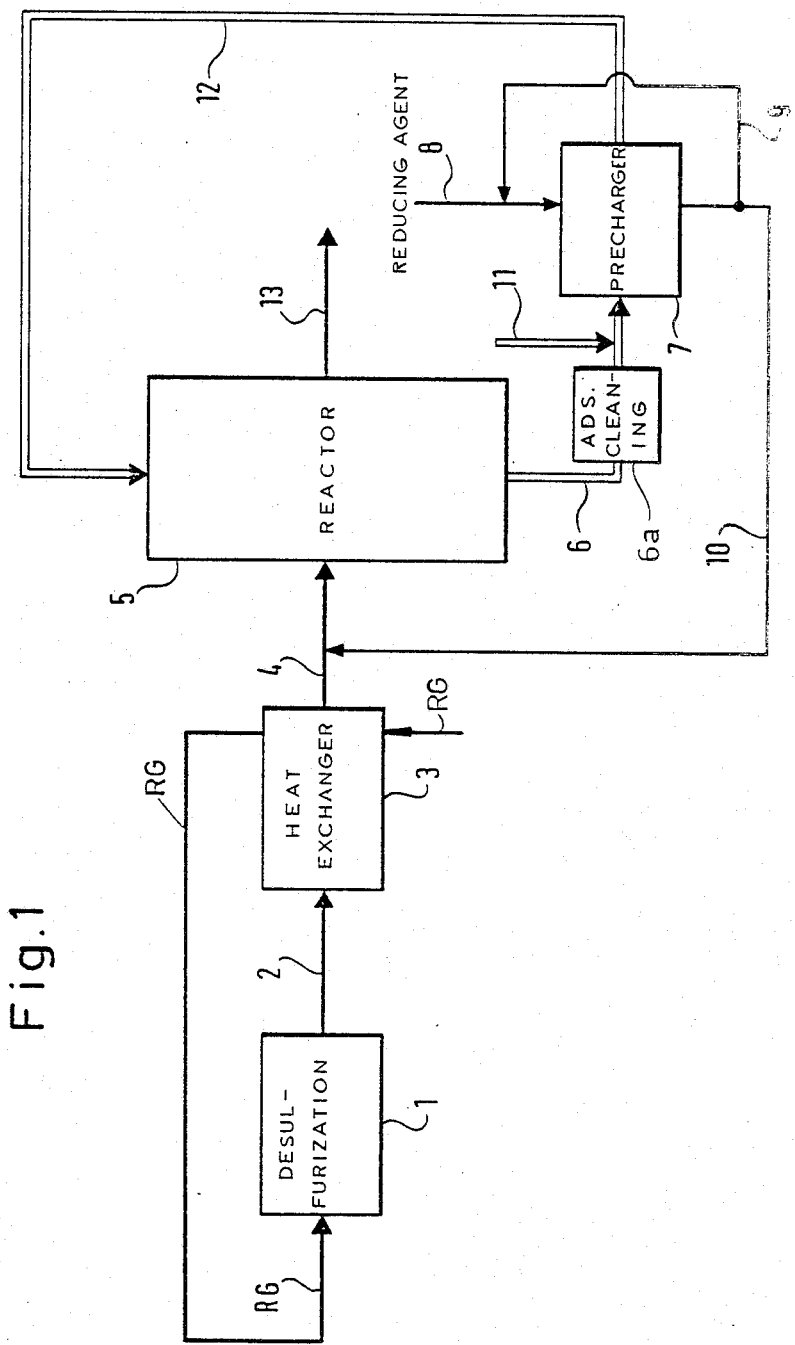
FIG. 1 is a flow diagram illustrating the $NO_x$ removal process of the invention utilizing a traveling-bed reactor and in which a prior desulfurization has been carried out.

In FIG. 1, we have shown the raw gas RG, e.g. a flue gas from a power plant or the like, which is fed to a desulfurization stage 1 which can be of the dry, semidry or wet type. Possible desulfurization techniques which may be used have been described previously.

The desulfurized gas is fed via line 2 to a heat exchanger 3 in which the desulfurized gas is passed in indirect heat exchange with the raw gas. The heat exchanger operation depends upon the characteristics of the desulfurization, and the desulfurized gas delivered at 4 to the reactor 5 should be brought to a temperature of 60° C. to 180° C.

The reactor 5 can be filled with a carbon-containing solid absorbent which can be active carbon, active coke or mixtures thereof.

In the embodiment of FIG. 1, the adsorbent reactor 5 is formed as a traveling-bed reactor from which the adsorbent, withdrawn at 6 and from which abraded particles and trapped solids are removed in an adsorbent cleaning stage 6a, is delivered to the precharging stage 7.

A line 8 can deliver the reducing agent to the precharger. This reducing agent can be a pure gas such as ammonia, carbon monoxide or hydrogen, or mixtures thereof, or a mixture of one or more of these gases with a diluent gas.

Excess reducing agent which is not taken up in the pores and by adsorption on the surfaces of the adsorbent is recycled at 9 to the precharger and/or is supplied at 10 to the flue gas before it meets the precharged adsorbent.

Via line 11, fresh adsorbent is added to make up for abrasion and wear of the adsorbent.

The precharged adsorbent is then fed via line 12 to the $NO_x$ removal stage, that is to the reactor 5, and the gaseous product substantially free from nitrogen oxides can be discharged at 13. By adjusting the parameters of NO$_x$ recovery appropriately, and by charging the adsorbent with 20 to 95% of the reducing agent required to removal the NO$_x$ to the desired degree, practically total NO$_x$ removal can be insured.

Figure 2:
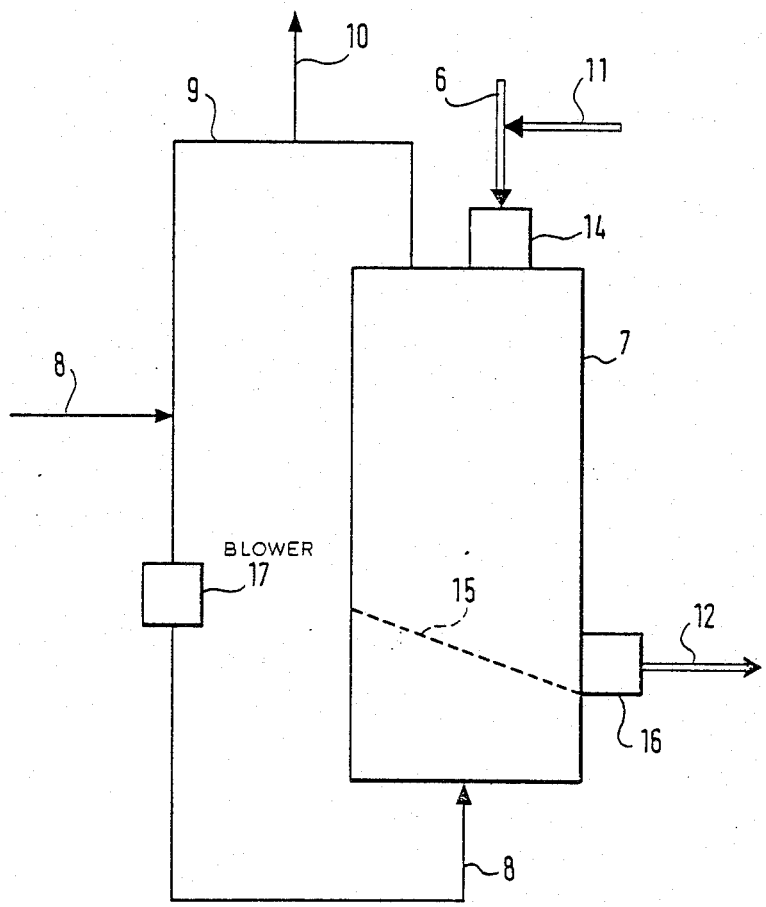
FIG. 2 is a diagram illustrating the precharging stage for precharging the adsorbent with a reducing agent which can be used in the process of FIG. 1.

In FIG. 2 we have shown in greater detail the operation of a precharging stage 7 as used in the embodiment of FIG. 1. The precharging is here carried out in a traveling-bed reactor 7 into the upper end of which through a gas tight gate 14 the adsorbent removed at 6 from the NO$_x$ removal stage 5 is fed.

The adsorbent travels downward against the rising stream of reducing agent, i.e. in counterflow.

The precharged adsorbent is recovered from above a gas distributor plate 15 through which the reducing agent is fed upward into the traveling bed. Another gas-tight gate 16 allows the withdrawal of the precharged adsorbent and its recirculation via pipeline 12 to the adsorber 5 utilizing a pneumatic conveyor or a mechanical conveyor, e.g. a flight conveyor or the like.

Line II introduces fresh adsorbent to make up for the wear in the NO$_x$ removal stage 5.

The reducing agent is fed by the blower 17 through the perforated plate 15 which distributes it uniformly in the traveling bed 7. At the head of the precharging column 7, the pipe 9 recovers a small fraction of the reducing agent which can be recycled as noted or delivered by line 10 to the gas phase, i.e. the flue gas, before it is admitted to the reactor 5.

Figure 3:
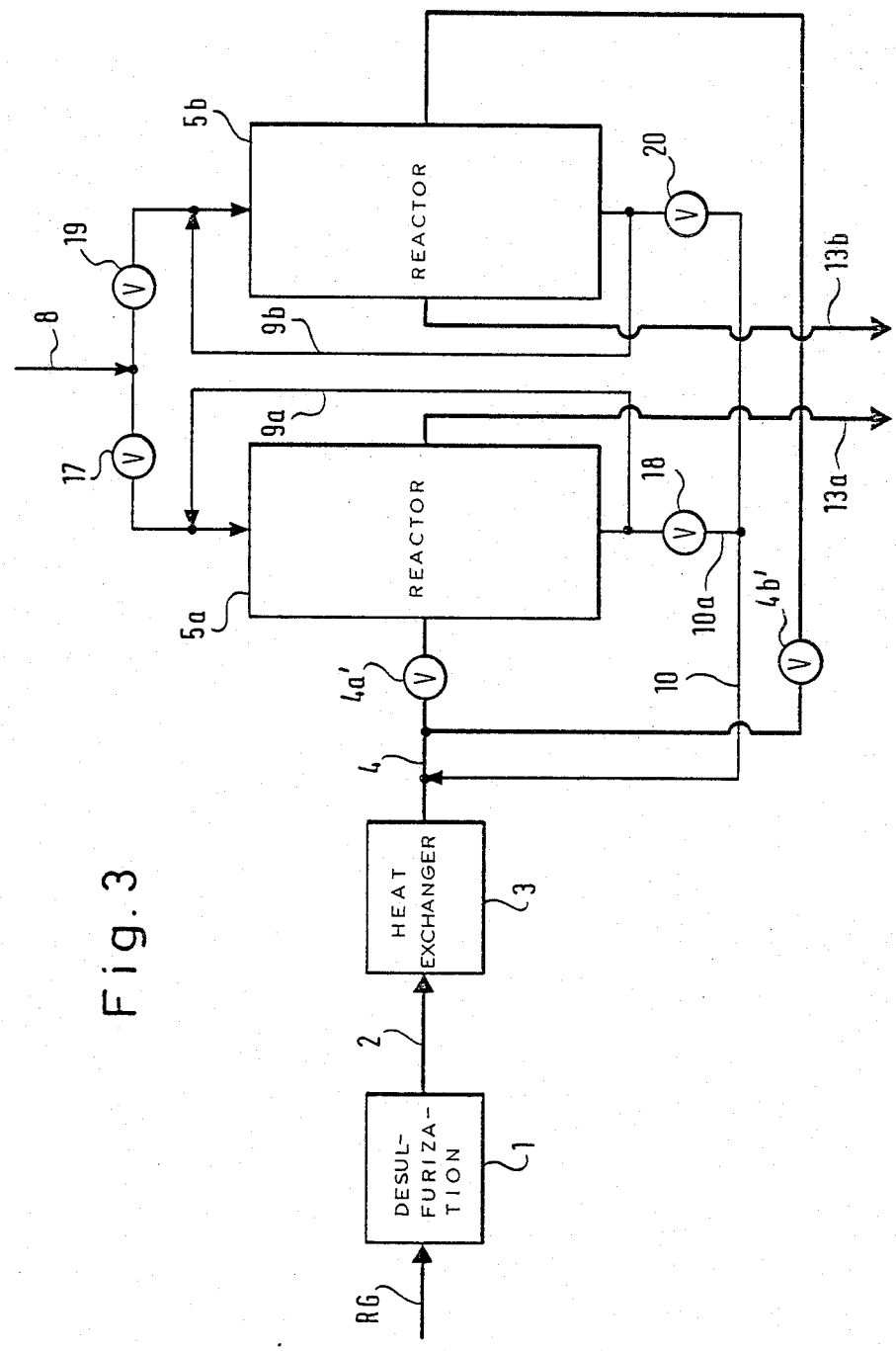
FIG. 3 is a similar diagram showing a two-reactor system in which the reactors are used alternatively for precharging with reducing agent and for $NO_x$ removal.

In the embodiment of FIG. 3, two adsorption reactors 5a and 5b are provided which can be operated as fixed-bed or traveling-bed reactors. These reactors can be traversed by the flue gas in counterflow or uniflow but preferably are traversed in cross flow.

Before supplying the reactor 5a with the raw gas to be cleaned, via the open valves 17 and 18 from the line 8, while valves 19 and 20 are closed, the reducing agent or the reducing agent diluent mixture is passed through the reactor 5a. At this point the reactor 5a is filled with the adsorbent. The portion of the reducing agent which is not taken up by the adsorbent can be passed via the line 9a for recirculation to the adsorber, or via the line 10 or 10a to the raw gas.

As soon as the adsorbent and the reactor 5a is charged to the desired degree with the reducing agent, valve 4a' is opened and valve 4b' is closed so that the gas is subjected to removal of the nitrogen oxides in the manner described. The cleaned gas is discharged through line 13a or 13b for the reactors b.

While raw gas is fed through the reactor 5a, the reactor 5 via the open valves 19 and 20, with valves 17 and 18 closed, is supplied with the reducing agent to recharge the adsorbent in the adsorber 5b from which the reducing agent has been at least partly depleted.

When the nitrogen oxide content in the cleaning gas emerging at 13a rises above the desired concentration in the vented gas, valve 4a' is closed and valve 4b is opened to functionally reverse the adsorbers and recharge the depleted adsorbent while continuously removing nitrogen oxide from the raw gas.

It is advantageous to provide precharging and nitrogen oxide removal conditions such that the spent adsorbent will be sufficiently charged with the reducing agent by the time switchover is required because of a rise in concentration of nitrogen oxides in the cleaned gas.

SPECIFIC EXAMPLE

The flue gas from a dry deashed bituminous coal combustion following lime-based desulfurization and reheating, the following parameters:
  Flue gas flow rate: 100,000 m$^3$/h STP
  Temperature: 90° C.
  Oxygen content: 6.5 Vol. %
  SO$_x$ content: <400 mg SO$_2$/m$^3$ STP
  NO$_x$ content: (calculated as NO$_2$) 650 mg/m$^3$ STP The traveling-bed reactor in this example is formed as a two-set reactor so that in the first stage the sulfur dioxide residues from desulfurization are deposited on the carbon-containing adsorbent as is customary. The sulfuric acid charged adsorbent can be regenerated by conventional thermal processes and returned to the upper part or head of the reactor. The second stage can be utilized for the NO$_x$ separation.

The traveling-bed reactor for NO$_x$ separation is filled with active coke having a cross-sectional area presented to the flow of about 150 m$^2$ and a bed thickness of 2.0 m. The reducing agent is ammonia which is supplied in an amount of 17.2 Kg/h.

In separate experiments, the ammonia was introduced only by adsorption in the active coke which was precharged therewith and supplied at a rate of 850 Kg of active coke per hundred from the charging stage to the head of the adsorber. The active coke was recovered at approximately the same rate and recycled through the adsorption stage.

In another test half of the quantity (17.2 Kg/h) of ammonia was added precharged in the active coke while the balance was sprayed into the flue gas just before it entered the reactor. In this case the active coke circulation was 425 Kg/h.

In both cases, the nitrogen oxide level of the flue gas leaving the reactor was about 195 mg/m$^3$STP calculated as NO$_2$ In the first case, however, the excess ammonia content in the clean flue gas was 6.0 mg/m$^3$STP while in the second gas it was 10 mg/m$^3$STP.

We claim:
1. A method of removing NO$_x$ from a flue gas, comprising the steps of:
  forming a traveling bed of solid, carbon-containing adsorbent in an adsorption reactor;
  feeding said NO$_x$ containing gas into said adsorption reactor and treating the gas in said reactor with a reducing agent so as to remove NO$_x$ from said gas;
  passing a stream of said carbon-containing adsorbent through a precharging unit and precharging said stream with the reducing agent such that the reducing agent permeates substantially throughout the adsorbent;
  feeding said adsorbent precharged with reducing agent into said adsorption reactor so that 50% to 100% of the reducing agent required for the removal of NO$_x$ in the gas is precharged in the adsorbent; and
  contacting and reacting the gas in the reactor with the reducing agent of the traveling bed of precharged adsorbent so as to catalytically extract NO$_x$ from the gas.
2. The method defined in claim 1 wherein more than 50% but less than 100% of the reducing agent required for the removal of NO$_x$ in the gas is precharged in the adsorbent and wherein the balance to 100% is added to the NO$_x$ containing gas before it contacts the adsorbent.

3. The method defined in claim 1 wherein the solid adsorbent is selected from the group consisting of active carbon, active coke and mixtures thereof.

4. The method defined in claim 1 wherein the reducing agent is selected from the group consisting of $NH_3$, CO and $H_2$.

5. The method defined in claim 1 wherein the precharging of the solid adsorbent is carried out by at least one of the steps of:
  feeding the stream of the adsorbent and a stream of the reducing agent together in uniflow;
  feeding the stream of the adsorbent and a stream of the reducing agent together in counterflow;
  feeding the stream of the adsorbent and a stream of the reducing agent together in crossflow; and
  feeding the stream of the reducing agent through a bed of the adsorbent.

6. The method defined in claim 1, further comprising the steps of:
  desulfurizing the flue gas prior to $NO_x$ removal; and
  heating the desulfurized flue gas to a temperature of substantially 60° C. to 180° C. before contacting the desulfurized flue gas with the precharged adsorbent.

7. The method defined in claim 6 wherein the desulfurized flue gas is heated to substantially 80° C. to 180° C. before contacting the precharged adsorbent.

8. The method defined in claim 1 wherein the gas from which the $NO_x$ is to be removed and the reducing agent are fed to two adsorbent reactors in one of which a removel of $NO_x$ is effected while in the other of which a precharging of the adsorbent with reducing agent is effected.

9. The method defined in claim 1 wherein the precharging of the adsorbent with the reducing agent is effected in a mixture of the reducing agent with a diluent gas.

10. The method defined in claim 1 wherein surplus reducing agent from the precharging of the adsorbent is admixed with the gas from which the $NO_x$ is to be removed before contacting the gas.

11. The method defined in claim 1 wherein during the precharging of the adsorbent the adsorbent suffers an abrasion loss, further comprising the step of
  making up the loss by adding fresh adsorbent to the precharged adsorbent before it contacts the gas from which the $NO_x$ is to be removed.

12. The method defined in claim 1 wherein the reducing agent is $NH_3$ and the molar ratio of the $NO_x$ to $NH_3$ in the process is between substantially 0.9 to 1.2.

* * * * *